Oct. 14, 1947.   R. S. PLEXICO   2,428,892
SYNCHROMESH TRANSMISSION
Original Filed Jan. 22, 1945   3 Sheets-Sheet 1

Inventor
Robert S. Plexico
By Blackmore, Jones & Flint
Attorneys

Oct. 14, 1947.  R. S. PLEXICO  2,428,892
SYNCHROMESH TRANSMISSION
Original Filed Jan. 22, 1945  3 Sheets-Sheet 2

Inventor
Robert S. Plexico
By Blackmore, Spencer & Flint
Attorneys

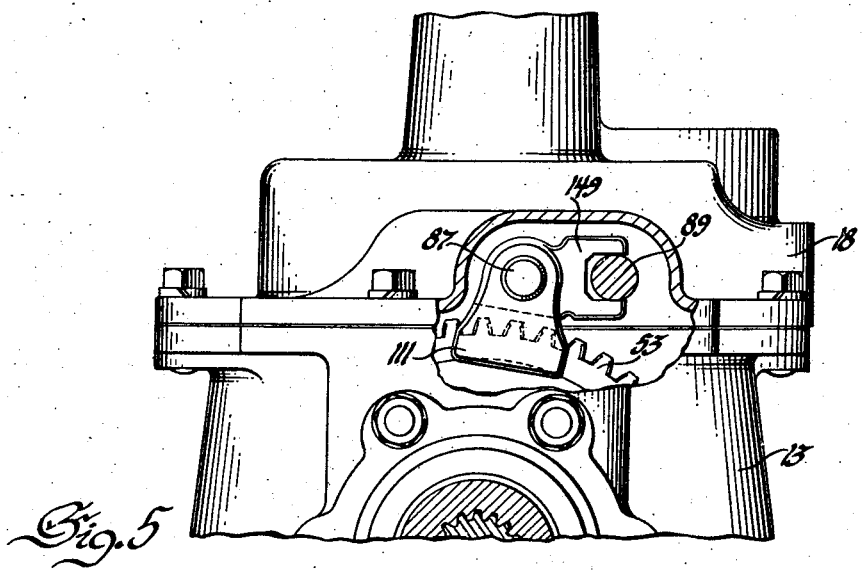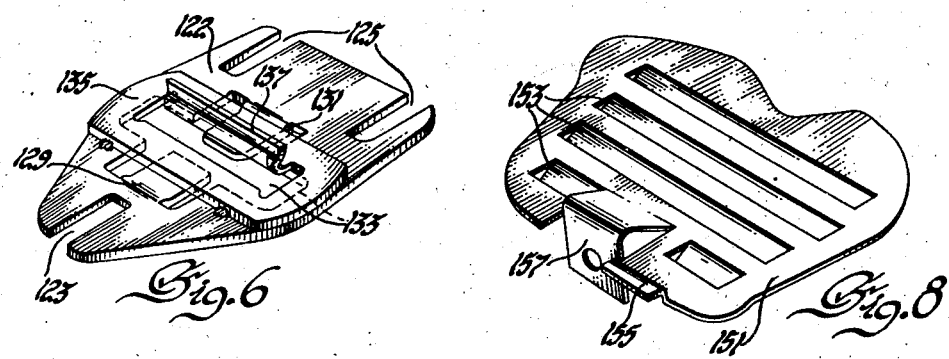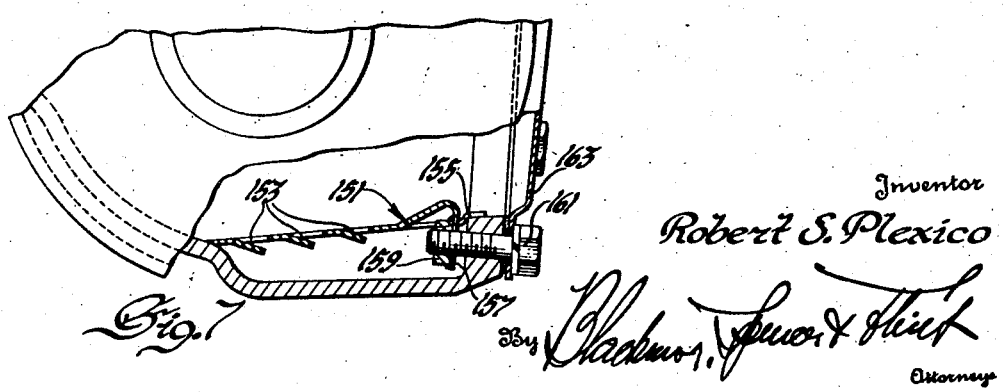

Patented Oct. 14, 1947

2,428,892

UNITED STATES PATENT OFFICE 2,428,892

SYNCHROMESH TRANSMISSION

Robert S. Plexico, Royal Oak, Mich., assignor to General Motors Corporation, Detroit, Mich., a corporation of Delaware Original application January 22, 1945, Serial No. 573,821. Divided and this application April 5, 1946, Serial No. 659,720

3 Claims. (Cl. 74—477)

This invention relates to a change speed transmission for vehicles providing four forward speed ratios and one reverse ratio, the shift into each of the three highest ratios being made with the aid of synchronizing mechanism.

The object of the invention is primarily to provide synchromesh for that driving ratio next above low speed. Other objects are concerned with novel structure by which the major object is attained and by which also there may be attained other objects and advantages which will be understood from the description which follows:

This application is a division of my application for Synchromesh transmission, Serial No. 573,821, filed January 22, 1945. The claims of the parent case relate to a synchronizing device. The claims of this application relate to shifting mechanism. The division is made to comply with an official requirement.

In the accompanying drawings:

Fig. 5 is a view in elevation partly broken away and in section, the plane of the section being marked 5—5 on Fig. 3.

Fig. 6 is a perspective of a detail.

Fig. 7 is a view in elevation partly broken away and in section to show a trap device to collect and retain foreign matter, see line 7—7 on Fig. 1.

Fig. 8 is a perspective view of the plate seen in section in Fig. 7.

Figure 1:
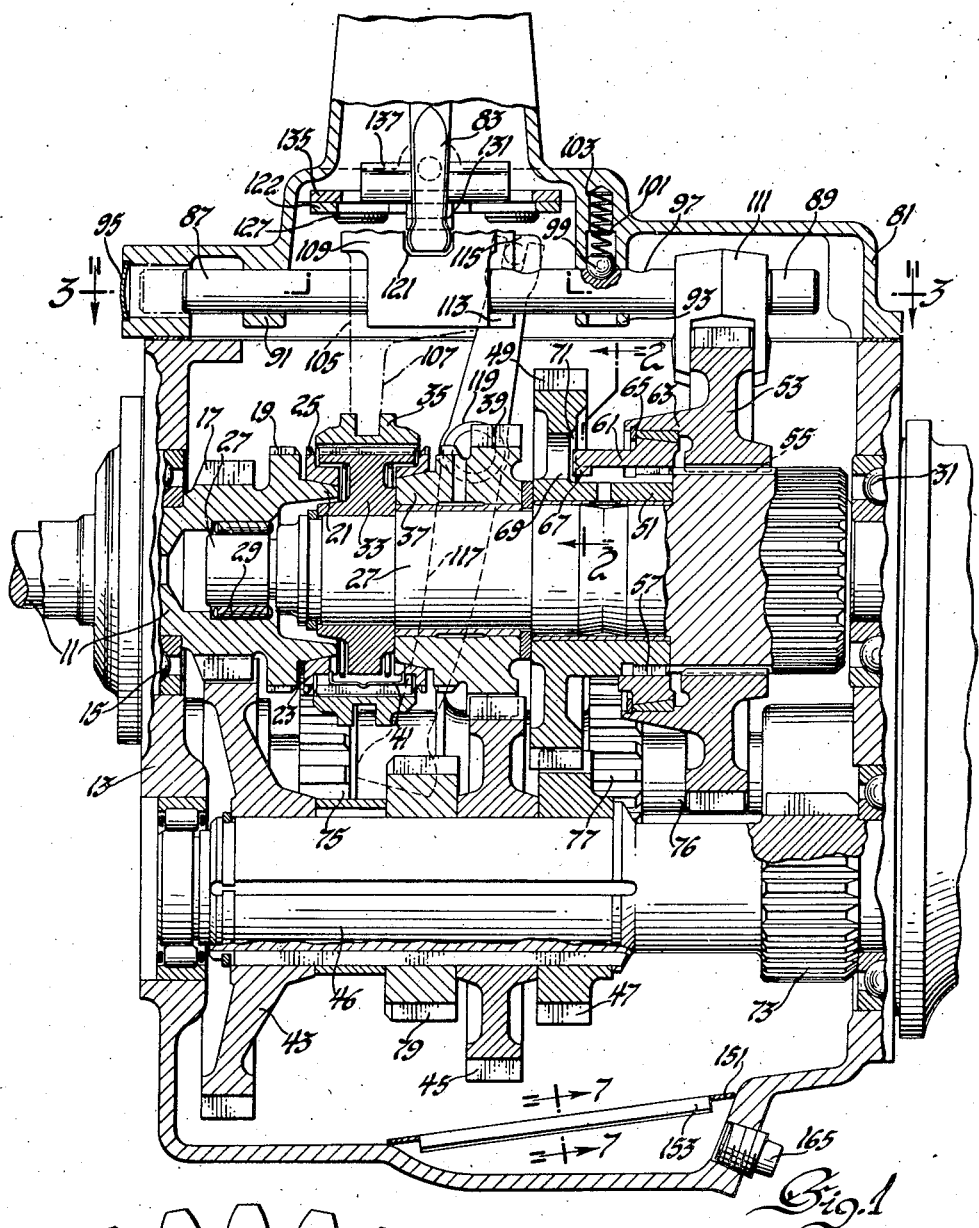
Fig. 1 is a vertical longitudinal section through the change speed transmission.

Referring by reference numerals to the drawing, a clutch shaft 11 from the engine and clutch enters the transmission housing 13 where it is supported by bearings 15. Within the housing, or gear box, shaft 11 carries a gear 17, a ring of clutch teeth 19 and it ends in a tapered cone 21. A synchronizing cone 23 with teeth 25 is adapted to rotate on surface 21.

A transmission shaft 27 extends from a pilot bearing 29 within the end of shaft 11 to and through bearings 31 in the rear wall of the gear box. Rigid with shaft 27 is a ring 33 peripherally formed to slidably guide a clutch ring 35. The internal teeth of the ring 35 are to mesh successively with clutch teeth 25 and 19. Rotatably mounted on shaft 27 is a gear 37. As in the case of the end of shaft 11, gear 37 has gear teeth 39, clutch teeth and a tapered end as shown together with a synchronizing cone with clutch teeth. These and other details need not be further described for the reason that no patentable novelty is being claimed for this mechanism by itself. Between the two synchronizing cones and the ring 35 is a spring device 41 so positioned that when ring 35 is moved toward the engine end of the gear box the cone 23 serves to synchronize the rates of rotation so that shaft 27 may be clutched without noise to rotate jointly with shaft 11.

Gear 17 on shaft 11 constantly drives gear 43 keyed to a countershaft 46 journaled in the gear casing walls as shown. A countershaft gear 45 is in constant mesh with gear teeth 39. When ring 35 is moved rearwardly it locks gear 37 to shaft 27 with the aid of the synchronizing means whereby shaft 11 drives shaft 27 at a speed ratio of less than unity. This may be called third speed, fourth speed being the expression used for the direct drive of shaft 27.

Figure 2:
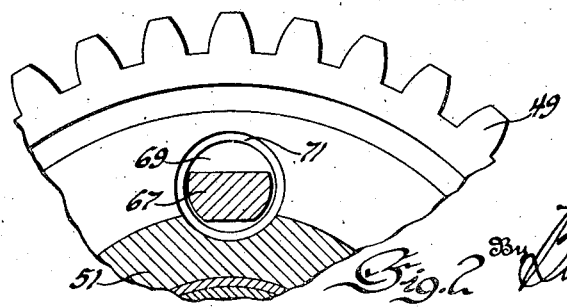
Fig. 2 is a view as seen from line 2—2 of Fig. 1.
Figure 3:
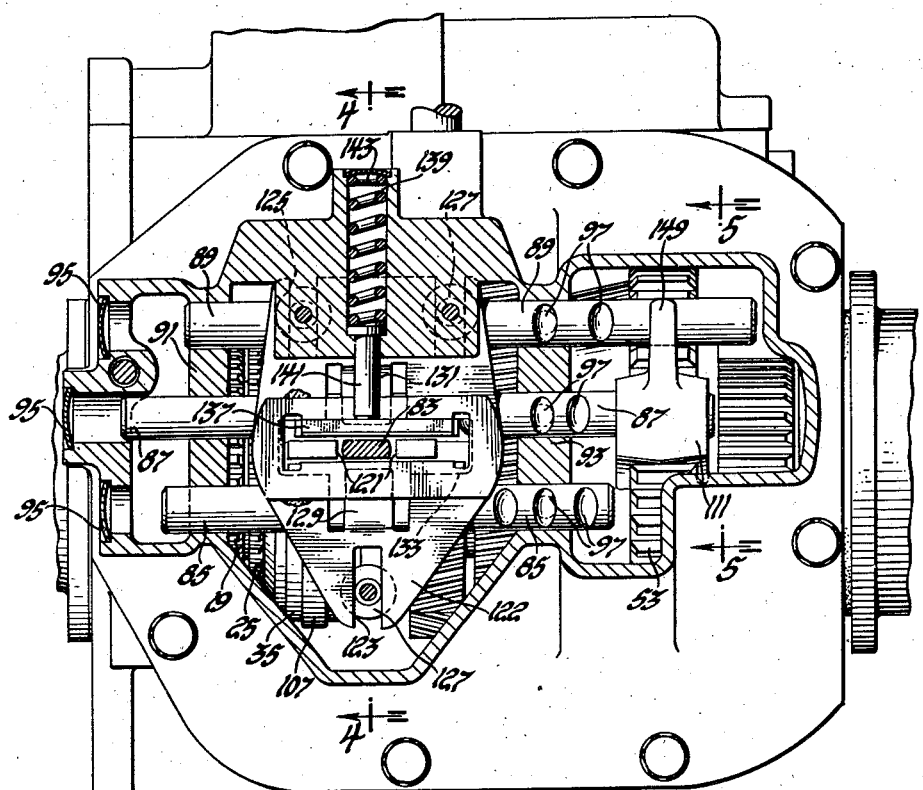
Fig. 3 is a section on the broken line 3—3 of Fig. 1.

The countershaft carries a gear 47 in constant mesh with a gear 49, gear 49 with its hub 51 being rotatably supported on shaft 27. Slidable but non-rotatable on shaft 27 is a gear 53. It has internal teeth 55 adapted to engage external teeth 57 on the hub 51 of gear 49 when moved toward gear 49. A synchronizing ring 61 is carried within a forward extension 63 of gear 53 and retained by a ring 65. There are the usual tapered faces on the gear extension and ring 61. Ring 61 has a plurality of axial extensions 67 shaped as shown by Fig. 2. Gear 49 has apertures 69 one for the passage of each extension 67. As gear 53 moves forwardly the ring 61 is carried with it. If gears 49 and 53 have unlike rates of rotation the ends of extensions 67 engage on one side or the other of the tapered faces 71 leading into the apertures 69 and resist further movement until the frictional resistance between the tapered surfaces effects synchronization. Then the ends 67 pass freely through the openings 69 and the teeth 55 and 57 engage. This second speed drive is therefore through gear train 17—43 and 47—49 the latter now locked to shaft 27.

Low or first speed is obtained by moving gear 53 toward the rear. It carries the synchronized device with it, the latter having no function in connection with low speed. As it moves toward the rear gear 53 slides into mesh with countershaft gear 73.

Reverse drive is effected by a pair of spaced gears 75 and 77 on a third shaft 76. When these gears are moved jointly, gear 75 is made to mesh with a countershaft gear 79 and gear 77 to mesh with gear 53. Reverse drive is therefore through gear trains 77—43, 79—75 and 77—53.

The mechanism for shifting the clutches and gears to get the several driving ratios is mounted in the cover 81. Into the dome of the cover there projects a manually operable lever 83 having a fulcrum, not shown. Within the cover are three rods or rails 85, 87, 89. The cover is formed with regions such as 91 and 93 to guide these rails as they reciprocate. Plugs 95 close openings in the cover through which openings the rails are assembled. This arrangement prevents loss of oil which might occur if the rails were slidably supported in end walls of the casing. The rails have notches 97 to receive detent balls 99 projecting from cover pockets 101 containing springs 103 to yieldably hold the rails in positions of adjustment. Carried by rail 85 is a lever engaging head 105 and a fork 107 the lower end of which engages a groove in ring 35. Rail 87 carries a second lever engaging head 109 located adjacent head 105. Rail 87 also carries a fork 111 axially spaced from head 109 and embracing gear 53. Rod 89 carries a head 113 directed laterally over rod 87 and terminating adjacent head 109. Rod 89 also has a projection 115 operatively engaging the upper end of a lever 117 pivoted to the casing at 119, its lower end being received within a collar of shaft 76 whereby gears 75 and 77 are moved. The three heads are notched as at 121 to selectively receive the end of lever 83 as it moves in one plane prior to being moved in a second plane to reciprocate one or another of the rods and engage the clutches or teeth as described.

Figure 4:
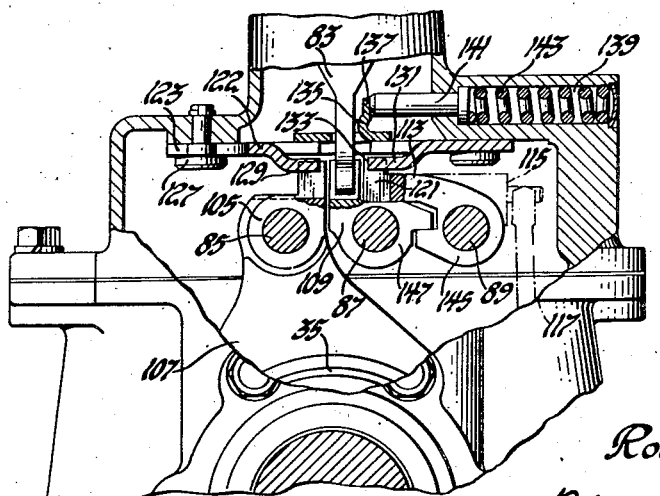
Fig. 4 is a section as indicated by line 4—4 of Fig. 3.

The mechanism to prevent the shift of any other than the selected rail is a plate 122. It slides along an inner overlying cover surface as shown by Fig. 4. It is guided by pins projecting through slots 123 and 125 of the plate and extending into the cover, the heads 127 serving as supporting means. Tongues 129, 131 are bent down into a plane below the plane of the plate. These tongues are dimensioned to slide into rail head slots 121. Plate 122 has a transverse slot 133 for the passage of the end of lever 83. Overlying and secured to plate 122 is another transversely slotted plate 135. The lever 83 passes through this slot. In one side of the slot of plate 135 is a bent up tongue 137. In a cover opening 139 is slidably mounted a pin 141 backed by a spring 143. In that position of the change speed mechanism wherein the lever is in the position shown by Fig. 4, the tongue 137 lies closely adjacent the end of pin 141. When the lever is selectively moved to enter the notch of head 105 it moves parts 135 and 122 with it. Tongue 131 while remaining in the notch of head 113 also enters the notch of head 109. Tongue 131 therefore holds both rails 89 and 87 when tongue 129 slides out from the notch of head 105. Then lever 83 may be moved in the slots of plates 122 and 135 to move rail 85 lengthwise of the transmission and engage the clutches for fourth speed or for third speed. In the position shown by Fig. 4 rail 85 is held by tongue 129 and rail 89 by tongue 131. Rail 87 may be moved to obtain second speed or low speed depending upon its direction of movement. If the lever is moved to engage the notch of head 113 tongue 129 locks rails 85 and 87. Lest, in the selecting movement, the lever 83 be moved beyond the notch of head 109 when a shift to the low or second speed is desired and into head 113 the tongue 137 engaging pin 141 resisted by spring 139 warns the operator of the excessive lever movement. The broad flat face of projection 137 intersecting the motion of pin 141 gives a steady continuous resistance feel to the lever 83 when the rail 89 is actually engaged.

It will be noticed that fork 111 embraces low speed driving gear 53. The rotation of this gear may tend to rotate fork 111 and its shaft 87 the more especially as some appreciable force is applied by the fork against the side of the gear in the act of synchronizing. Any such rotation might interfere with a free relationship between the head 109 and the interlocking plate. To prevent any rotation of rail 87 the fork 111 has a lateral arm 149 forked to straddle rail 89 as best seen in Fig. 5. It is also necessary to prevent any axial rotation of rail 89. Fig. 4 shows that the heads 109 and 113 have extensions with overlying faces 145 and 147 so that the non-rotation of rail 87 ensured as explained above prevents, by contact of parts of 109 and 113, any rotation of rail 89. By this means the correct position of the interlocking plate 122 and the heads 109 and 113 is effected. Head 105 and rail 85 cannot rotate because fork 107 embraces ring 35.

Extending transversely across the gear housing near the bottom thereof is a plate 151 with tongues 153 bent down therefrom. Preferably the end of plate 151 has a part 155 resting on a casing surface and a bent tongue 157 which may be welded to a nut 159 engaged by a bolt 161 which serves to hold a cover 163. The enclosure serves to trap chips and foreign matter driven by the rotating gears through the openings. A conventional plug 165 will provide for draining oil and the removal of sediment. The resiliency of tongue 157 is such that the attachment by the bolt 161 is sufficient to hold the chip plate in the position shown.

I claim:

1. In a change speed transmission having shift rails, means to select from among said rails and thereafter to shift a selected rail, an interlocking plate for said rails, means carried by a first rail and straddling a second rail whereby the first rail is kept from rotation on its axis to maintain the first rail in proper position for engagement with the interlocking plate.

2. In a change speed transmission having shift rails, means to select from among said rails and thereafter to shift a selected rail, an interlocking plate for said rails, means carried by a first rail and straddling a second rail whereby the first rail is kept from rotation on its axis to maintain the first rail in proper position for engagement with the interlocking plate and cooperating engaging means on said first and second rails whereby the first rail, restrained from rotation by the second rail as stated above, restrains the second rail from rotation to thereby keep it in operative position for engagement by the interlocking plate.

3. In a four forward speed and reverse transmission having three shift rails slidable for making shifts, a lever movable in one plane to select from among said rails and in another plane to move a selected rail, an interlocking plate moved by said lever to lock two rails in each position of selection, an abutment carried by said interlocking plate, a spring pressed plug carried by said transmission and adapted to be moved by said abutment in response to the movement of the lever in the act of selecting that rail which controls reverse.

ROBERT S. PLEXICO.

REFERENCES CITED

The following references are of record in the file of this patent:

UNITED STATES PATENTS

| Number | Name | Date |
| --- | --- | --- |
| 2,320,454 | Eberhard | June 1, 1943 |
| 1,909,644 | Wescott | May 16, 1933 |
| 2,327,550 | Peterson et al. | Aug. 24, 1943 |

FOREIGN PATENTS

| Number | Country | Date |
| --- | --- | --- |
| 548,565 | Germany | Apr. 19, 1932 |